United States Patent
Sasaoka et al.

(10) Patent No.: US 9,199,436 B2
(45) Date of Patent: Dec. 1, 2015

(54) GAS-BARRIER LAMINATE

(75) Inventors: Yasushi Sasaoka, Ibaraki (JP); Chiharu Okawara, Ibaraki (JP); Tooru Hachisuka, Ibaraki (JP)

(73) Assignee: MITSUBISHI PLASTICS, INC., Tokyo (JP)

( * ) Notice: Subject to any disclaimer, the term of this patent is extended or adjusted under 35 U.S.C. 154(b) by 27 days.

(21) Appl. No.: 14/235,671

(22) PCT Filed: Jul. 27, 2012

(86) PCT No.: PCT/JP2012/069219
§ 371 (c)(1),
(2), (4) Date: Jan. 28, 2014

(87) PCT Pub. No.: WO2013/018720
PCT Pub. Date: Feb. 7, 2013

(65) Prior Publication Data
US 2014/0154517 A1   Jun. 5, 2014

(30) Foreign Application Priority Data

Aug. 4, 2011 (JP) ................................. 2011-170886

(51) Int. Cl.
| | |
|---|---|
| B32B 27/08 | (2006.01) |
| B32B 27/40 | (2006.01) |
| B32B 27/36 | (2006.01) |
| B32B 7/12 | (2006.01) |
| B32B 27/30 | (2006.01) |
| C09D 1/00 | (2006.01) |

(52) U.S. Cl.
CPC . B32B 27/08 (2013.01); B32B 7/12 (2013.01); B32B 27/308 (2013.01); B32B 27/36 (2013.01); C09D 1/00 (2013.01); *B32B 2255/10* (2013.01); *B32B 2255/20* (2013.01); *B32B 2307/412* (2013.01); *B32B 2307/518* (2013.01); *B32B 2307/7242* (2013.01); *B32B 2439/80* (2013.01); *Y10T 428/31565* (2015.04)

(58) Field of Classification Search
CPC ........ B32B 27/08; B32B 27/12; B32B 27/36; B32B 27/308; B32B 2307/412; B32B 2307/518; B32B 2307/7242; B32B 2255/10; B32B 2255/20; B32B 2439/80; C09D 1/00; Y10T 428/31565
USPC ........................................................ 428/423.7
See application file for complete search history.

(56) References Cited

U.S. PATENT DOCUMENTS

| | | | |
|---|---|---|---|
| 2002/0037418 A1 | 3/2002 | Peiffer et al. | |
| 2004/0115445 A1* | 6/2004 | Sasaki et al. | 428/451 |
| 2011/0197962 A1* | 8/2011 | Kawakami | 136/256 |
| 2014/0106151 A1* | 4/2014 | Mori | 428/216 |

FOREIGN PATENT DOCUMENTS

| | | |
|---|---|---|
| JP | 11 147276 | 6/1999 |
| JP | 2002 103547 | 4/2002 |
| JP | 2004 066619 | 3/2004 |
| JP | 2005-178149 A | 7/2005 |
| JP | 2008-80540 A | 4/2008 |
| JP | 2008 255266 | 10/2008 |
| JP | 2010 012745 | 1/2010 |
| JP | 2010 016286 | 1/2010 |
| WO | 2010 005029 | 1/2010 |

OTHER PUBLICATIONS

Extended European Search Report issued on Feb. 13, 2015 in the corresponding European Application No. 12819549.2.
International Search Report issued Oct. 30, 2102 in PCT/JP12/069219 Filed Jul. 27, 2012.

* cited by examiner

*Primary Examiner* — Thao T Tran
(74) *Attorney, Agent, or Firm* — Oblon, McClelland, Maier & Neustadt, L.L.P.

(57) ABSTRACT

In the gas-barrier laminate having an inorganic thin layer formed on at least one surface of a substrate having a polyethylene naphthalate layer, provided by the present invention is a gas-barrier laminate having not only high water vapor barrier property and oxygen barrier property abut also excellent adhesion between the substrate and the inorganic thin layer. The said gas-barrier laminate, comprising: a substrate comprising a polyethylene naphthalate layer; a layer formed from a composition comprising an acryl polyol and an isocyanate compound on at least one surface of the substrate; and an inorganic thin layer, arranged in the stated order.

17 Claims, No Drawings

GAS-BARRIER LAMINATE

TECHNICAL FIELD

The present invention relates to a gas-barrier laminate, or in more detail, a gas-barrier laminate having an inorganic thin layer formed on a substrate film.

BACKGROUND ART

In the past, a gas-barrier laminate having an inorganic layer formed of silicon oxide, aluminum oxide, magnesium oxide, or the like on surface of a plastic film as a substrate has been used widely for packaging of goods that require to be shielded from water vapor and various gases such as oxygen; for example, for packaging of a food stuff, an industrial good, a medical drug, and so forth to prevent change of qualities thereof from occurring. In recent years, this gas-barrier laminate also receives attention in new uses such as a transparent conductive sheet used in a liquid crystal display element, a solar cell, an electromagnetic shield, a touch panel, an EL substrate, a color filter and so on, in addition to for the packaging.

In the gas-barrier laminate having an inorganic thin formed as mentioned above, various modifications have been studied to suppress the decrease in the gas barrier properties, or to enhance the gas barrier properties further; and for example, in Patent Document 1, a gas-barrier film having a metal oxide thin formed on the substrate of polyethylene naphthalate (hereinafter, this is sometimes referred to as "PEN") by a plasma chemical gas phase method is described. Furthermore, in Patent Document 2, a gas-barrier film having a resin reacted with a certain component coated on surface of a polyester resin film such as PEN is described.

Patent Document 1: Japanese Patent Laid-Open Publication No. 2004-66619

Patent Document 2: Japanese Patent Laid-Open Publication No. 2010-12745

SUMMARY OF THE INVENTION

Problems to be Solved by the Invention

However, in the gas-barrier films described in these Patent Documents, sufficient gas barrier properties cannot be obtained, so that in the use for a medical drug, a solar cell, an organic EL, and the like, in which a barrier property, especially a high water vapor barrier property, is wanted in recent years, the performance thereof has been still insufficient. Moreover, in the technologies described in the foregoing Patent Documents, adhesion between a substrate and an inorganic thin layer is not always sufficient, so that there has been a possibility of delamination between these layers.

Under the situation as mentioned above, an object of the present invention is to provide a gas-barrier laminate comprising an inorganic thin layer formed on at least one surface of a substrate containing a PEN layer whereby having a high water vapor barrier property as well as an excellent oxygen-barrier property and also having excellent adhesion between the substrate and the inorganic thin layer.

Means for Solving the Problems

Inventors of the present invention carried out an extensive investigation to solve the problems mentioned above; and as a result, they found, in a gas-barrier laminate, an optimum anchor coat material to a substrate having a PEN layer, thereby completing the present invention.

That is, the present invention relates to:

(1) A gas-barrier laminate, comprising: a substrate comprising a polyethylene naphthalate layer; a layer formed from a composition comprising an acryl polyol and an isocyanate compound on at least one surface of the substrate; and an inorganic thin layer, arranged in the stated order, (2) The gas-barrier laminate according to (1), wherein the substrate contains further a polyethylene terephthalate layer, (3) The gas-barrier laminate according to (2), wherein the substrate contains further a mixed layer of polyethylene naphthalate and polyethylene terephthalate, (4) The gas-barrier laminate according to any one of (1) to (3), wherein the mass ratio of the acryl polyol to the isocyanate compound, (acryl polyol)/(isocyanate compound), is in the range of 0.01 to 0.5, and (5) The gas-barrier laminate according to any one of (1) to (4), wherein the gas-barrier laminate is used as a packaging material for a medical purpose.

Effect of the Invention

According to the present invention, provided is a gas-barrier laminate comprising an inorganic thin layer formed on a substrate comprising a PEN layer thereby having a high water vapor barrier property as well as an excellent oxygen barrier property and also having excellent adhesion between the substrate and the inorganic thin layer.

MODES FOR CARRYING OUT THE INVENTION

The gas-barrier laminate according to the present invention, comprising: a polyester substrate comprising a polyethylene naphthalate (PEN) layer; a layer formed from a composition comprising an acryl polyol and an isocyanate compound on at least one surface of the said substrate; and an inorganic thin layer, arranged in the stated order.

1. Substrate Having a PEN Layer

The substrate having a PEN layer used in the present invention has at least one PEN layer, and thus, a single layer formed of the PEN layer may be allowed; however, a multilayer comprising the PEN layer and a layer of a polyester such as polyethylene terephthalate (PET) may also be allowed suitably. As to the multilayer substrate, in order to render both the excellent barrier properties owned by PEN and the economy owned by PET, for example, a bilayer substrate comprising PEN layer/PET layer and a three-layer substrate comprising PEN layer/mixed PET-PEN layer/PET layer may be used.

In view of the afore-mentioned, the substrate having the PEN layer used in the present invention is preferably the three-layer substrate comprising PEN layer/mixed PET-PEN layer/PET layer.

If the substrate has the bilayer structure comprising PEN layer/PET layer or the three-layer structure comprising PEN layer/mixed PET-PEN layer/PET layer, a PEN layer may be further laminated on the side of the PET layer.

Note that, in this paragraph, /(slush) represents the interface of the layers.

The foregoing substrate may be stretched or unstretched; however, in view of physical properties of the film, a biaxially stretched substrate is preferable.

The substrate like this may be produced by heretofore known methods; for example, a raw material including a resin is melted in an extruder, extruded preferably simultaneously by using a circular die or a T-die, and then cooled promptly to obtain an unstretched film which is substantially amorphous and unorientated. In addition, by using a multilayer die, a monolayer film comprising one resin, a multilayer film comprising one resin, a multilayer film comprising various resins, and so forth may be produced. Then, this unstretched film may be stretched in the direction along the film flow (longitudinal) or in the direction perpendicular to the film flow (transverse) to obtain a monoaxially or biaxially stretched film by heretofore know methods such as a monoaxial stretching method, a tenter type sequential biaxial stretching method, a tenter type simultaneous biaxial stretching method, and a tubular type simultaneous biaxial stretching method. The stretch magnification rate may be determined arbitrarily, though the magnification rate in the flow direction is usually in the range of about 2 to about 6, or preferably in the range of 2.5 to 5, while the stretch magnification ratio in the transverse direction (direction of across the width) is usually in the range of about 2 to about 5, or preferably in the range of 2.5 to 4.

Meanwhile, the content rate of PEN in the PEN layer is preferably in the range of 50% or more and 100% or less by mass. The content rate of PEN in the mixed layer of PEN and PET is preferably in the range of more than 1% and less than 50% by mass, and the content rate of PET therein is preferably in the range of more than 50% and less than 99% by mass. The content rate of PET in the PET layer is preferably in the range of 50% or more and 100% or less by mass.

PEN in the foregoing PEN layer is not only a homopolymer of ethylene-2,6-naphthalate, but also a copolymer containing an ethylene terephthalate unit in addition to the ethylene-2,6-naphthalate unit, and also a copolymer containing the ethylene-2,6-naphthalate unit, the ethylene terephthalate unit, and a unit derived from a dicarboxylic acid and an alicyclic diol and/or an aromatic diol; and further, a mixture of the said homopolymer with the above-mentioned copolymers may also be included therein.

As to the foregoing alicyclic diol, an alicyclic diol having one or more ring which may optionally contain a heteroatom is preferably used, wherein specifically more preferable example thereof is a cyclohexane diol such as 1,4-cyclohexanediol. Preferable example of the aromatic diol is a diol shown by HO—$C_6H_4$—X—$C_6H_4$—OH (in the formula, X represents —$CH_2$—, —$C(CH_3)_2$—, —$C(CF_3)_2$—, —O—, —S—, and —$SO_2$—), while bisphenol shown by HO—$C_6H_4$—$C_6H_4$—OH is also preferable.

As to the dicarboxylic acid, an aromatic dicarboxylic acid, an alicyclic dicarboxylic acid, and an aliphatic dicarboxylic acid are preferable.

Preferable example of the aromatic dicarboxylic acid includes benzene dicarboxylic acid, a naphthalene dicarboxylic acid such as naphalene-1,4- or -1,6-dicarboxylic acid, a biphenyl-X,X'-dicarboxylic acid such as biphenyl-4,4'-dicarboxylic acid, a diphenylacetylene-X,X-dicarboxylic acid such as diphenylacetylene-4,4'-dicarboxylic acid, and a stilbene-X,X-dicarboxylic acid. Preferable example of the alicyclic dicarboxylic acid includes cyclohexane dicarboxylic acid such as cyclohexane-1,4-dicarboxylic acid. Preferable example of the aliphatic dicarboxylic acid includes a C3 to C19 alkane dicarboxylic acid, wherein the said alkane may be linear or branched.

The foregoing substrate may contain, as necessarily, heretofore known additives such as for example, an antistatic agent, a light-shielding material, an UV absorber, a plasticizer, a sliding agent, a filler, a colorant, a stabilizer, a lubricating material, a crosslinking agent, an antiblocking material, and an antioxidant.

The substrate is not restricted in its thickness; however, in view of gas barrier properties of the gas-barrier laminate as well as in view of mechanical strength, flexibility, transparency, and so forth as the substrate, the total thickness thereof is usually in the range of about 5 to about 500 µm, preferably in the range of 10 to 200 µm, or more preferably in the range of 10 to 50 µm.

In the case of the bilayer structure such as the one comprising PEN layer/PET layer, the ratio of each of the PEN layer and the PET layer relative to the total thickness is preferably in the range of 0.1 to 99.9%, more preferably in the range of 1 to 99%, or still more preferably in the range of 5 to 95%.

In the case of the three-layer structure such as the one comprising PEN layer/mixed PET-PEN layer/PET layer, the ratio of each of the PEN layer, the PET layer, and the mixed PET-PEN layer relative to the total thickness is preferably in the range of 0.1 to 99.8%, more preferably in the range of 1 to 98%, or still more preferably in the range of 5 to 90%.

Note that, in this paragraph, /(slush) represents an interface of the layers.

2. Anchor Coat Layer

In the gas-barrier laminate of the present invention, a layer of a composition comprising an acryl polyol and an isocyanate compound (hereinafter, this layer is sometimes referred to as "anchor coat layer") is formed on at least one surface of the substrate having the PEN layer. By forming this anchor coat layer, it is assumed that a minute space generated in the inorganic thin layer becomes difficult to be formed so that the water vapor barrier property as well as the oxygen barrier property of the obtained laminate is enhanced while allowing to obtain the gas-barrier laminate having excellent adhesion between the substrate and the inorganic thin layer.

The anchor coat layer is formed between the substrate and the inorganic layer. In the case that the substrate has a multilayer structure, it is preferable that this anchor coat layer be formed on the side of the PEN layer.

As mentioned before, the composition to constitute the anchor coat layer in the present invention contains an acryl polyol. In the present invention, the acryl polyol contributes to enhancement of the gas barrier properties. As to the acryl polyol, a polymer obtained by polymerizing, as an essential component, a hydroxyl-containing monomer such as 2-hdyroxyethyl (meth)acrylate or 2-hydroxypropyl (meth)acrylate with, as a main component, a (meth)acrylic acid monomer or an alkyl (meth)acrylate monomer, wherein the said alkyl group being a methyl group, an ethyl group, a n-propyl group, an i-propyl group, a n-butyl group, an i-butyl group, a t-butyl group, a 2-ethylhexyl group, or a cyclohexyl group, is preferably used because these polymers are effective to enhance the gas barrier properties. Moreover, the usable polymer includes a copolymer obtained by copolymerizing the aforementioned hydroxyl-containing monomer with (meth)acrylic acid monomer and/or an alkyl (meth)acrylate monomer and with a monomer other than these monomers, such as, an amide-containing monomer including (meth)acrylamide, a N-alkyl (meth)acrylamide, a N,N-dialkyl (meth)acrylamide (illustrative example of the alkyl group in these monomers includes a methyl group, an ethyl group, a n-propyl group, an i-propyl group, a n-butyl group, an i-butyl group, a t-butyl group, a 2-ethylhexyl group, and a cyclohexyl group), a N-alkoxy (meth)acrylamide, a N,N-dialkoxy (meth)acrylamide (illustrative example of the alkoxy group in these monomers includes a methoxy group, an ethoxy group, a butoxy group, and an isobutoxy group), N-methylol (meth)acrylamide, and N-phenyl (meth)acrylamide; and a glycidyl-containing monomer including glycidyl (meth)acrylate and allyl glycidyl ether.

Moreover, the polymer usable therein includes copolymers of the above-mentioned polymers with a monomer such as vinyl isocyanate, allyl isocyanate, styrene, α-methylstyrene, vinyl methyl ether, vinyl ethyl ether, maleic acid, an alkyl maleate mono ester, fumaric acid, an alkyl fumarate mono ester, itaconic acid, an alkyl itaconate mono ester, (meth) acrylonitrile, vinylidene chloride, ethylene, propylene, vinyl chloride, vinyl acetate, butadiene, and so forth. These acryl polyols may be used solely or as a combination of two or more of them.

In view of enhancement of the gas barrier properties, content of the acryl polyol in the composition to constitute the anchor coat layer in the present invention is preferably in the range of 1 to 20% by mass, or more preferably in the range of 2 to 10% by mass, relative to the total solid amount in the composition.

Moreover, the composition that constitutes the anchor coat layer of the present invention contains an isocyanate compound.

In view of enhancement of the gas barrier properties, content of the isocyanate compound in the composition that constitutes the anchor coat layer of the present invention is preferably in the range of 5 to 99% by mass, or more preferably in the range of 50 to 95% by mass, relative to the total solid amount in the composition.

As to the isocyanate compound, diisocyanate is preferable, while illustrative example thereof includes an aromatic diisocyanate such as xylene diisocyanate (XDI) and diphenylmethane diisocyanate (MDI); an aliphatic diisocyanate such as hexamehylene diisocyanate (HDI); an alicyclic diisocyanate such as isophorone diisocyanate (IPDI) and dicylohexylmethane diisocyanate (H12MDI); a mixture of 3 moles of hexamethylene diisocyanate and 1 mole of trimethlolpropane; triphenylmethane triisocyanate; and other various isocyanate compounds. In the present invention, in view of the gas barrier properties, adhesion properties, and so forth, the above-mentioned aromatic diisocyanates or aliphatic diisocyanates are preferably used.

2-1. Composition

The composition that constitutes the anchor coat layer in the present invention contains the foregoing acryl polyol and the isocyanate compound, wherein, in view of enhancement of the gas barrier properties, the blending ratio of the acryl polyol and the isocyanate compound, (acryl polyol)/(isocyanate compound), is preferably in the range of 0.01 to 0.5 by mass ratio, more preferably in the range of 0.05 to 0.3 by mass ratio, or still more preferably in the range of 0.05 to 0.15 by mass ratio. Note that, the mass ratio herein means the mass ratio in terms of the solid amount.

The foregoing composition may further contain arbitrarily additives such as other polyol, various stabilizers and crosslinking agents, and a filler, as necessary.

In the case that a coating solution is used to form the anchor coat layer by using the foregoing composition, a solvent to dissolve the foregoing each component may be used as necessary. Illustrative example of the solvent includes toluene, xylene, ethyl acetate, butyl acetate, acetone, methyl ethyl ketone, methyl isobutyl ketone, tetrahydrofuran, dimethyl formamide, dimethyl acetamide, methanol, ethanol, and water. In the present invention, in view of uniform coating, methyl ethyl ketone is preferably used as the foregoing solvent. The coating solution may be in the state of any of an emulsion and a dissolved solution.

2-2. Anchor Coat Layer

The anchor coat layer is formed from a composition comprising an acryl polyol and an isocyanate compound as mentioned above, wherein formation of the anchor coat layer by coating this composition may be done by appropriately selecting a method from heretofore known coating methods. Any coating method using, for example, a reverse roll coater, a gravure coater, a rod coater, an air doctor coater, and a spray may be used. Alternatively, coating may be done by dipping a substrate into a resin solution comprising the above-mentioned composition. After coating, it is dried by a heretofore known method including an infrared drying method and a heating drying method such as a hot-air drying method and a hot roll drying method in the temperature range of about 40° C. to about 180° C. Moreover, in order to enhance water resistance and sustainability, a crosslinking treatment by exposure to an electron beam may also be carried out. Formation of the anchor coat layer may be done on the way of the substrate manufacture line (in-line method), or after manufacture of the substrate (off-line method).

In order to obtain an optimal adhesion between the substrate and the anchor coat layer, thickness of this anchor coat layer is preferably in the range of 0.001 to 1 µm, more preferably in the range of 0.005 to 0.5 µm, or still more preferably in the range of 0.01 to 0.1 µm.

3. Inorganic Thin Layer

The gas-barrier laminate of the present invention has an inorganic thin layer on surface of the anchor coat layer formed on the substrate as mentioned above. In the case that the substrate is the multilayer structure, it is preferable to form the inorganic layer on the PEN side thereof.

Illustrative example of the inorganic substance to constitute this inorganic thin layer includes silicon, aluminum, magnesium, zinc, tin, nickel, and titanium; oxides, carbides, and nitride of them; and a mixture of them. Preferable example thereof includes silicon oxide, silicon nitride, silicon oxynitride, silicon oxycarbide, silicon oxynitride carbide, aluminum oxide, and diamond-like carbon. Especially silicon oxide, silicon nitride, silicon oxynitride, silicon oxycarbide, silicon oxynitride carbide, and aluminum carbide are preferable because the high gas barrier properties can be kept stably.

To form the inorganic thin layer, any method including a vapor deposition method and a coating method may be used, while a vapor deposition method is preferable because it gives a uniform thin layer having the high gas barrier properties. This vapor depositing method includes PVD (physical gas phase vapor deposition) such as vacuum deposition, ion plating, and spattering; and CVD (chemical gas phase vapor deposition) such as a plasma CVD using a plasma and a catalytic chemical gas phase growing method (Cat-CVD) in which a raw material gas is subjected to catalytic and thermal decomposition by using a thermal catalyst.

Thickness of the inorganic thin layer is generally in the range of about 0.1 to about 500 nm, or preferably in the range of 1 to 100 nm. If the thickness is within this range, sufficient gas barrier properties can be obtained; and in addition, high transparency can be obtained without generating cracks and delamination in the inorganic thin layer.

The inorganic thin layer may be any of a monolayer and a multilayer comprising two or more layers. In the case of the inorganic thin layer of a multilayer comprising two or more layers, these layers may be same or different.

4. Gas-barrier Laminate

The gas-barrier laminate of the present invention, comprising: the substrate comprising the PEN layer; the layer of a composition comprising the acryl polyol and the isocyanate compound on at least one surface of the substrate; and the inorganic thin layer, arranged in the stated order. By arranging each layer in this manner, the obtained laminate has the high gas barrier properties, especially the high water vapor barrier property, and in addition, it shows excellent adhesion between the substrate and the inorganic thin layer.

In the gas-barrier laminate of the present invention, a protective resin layer may be formed, as necessary, on surface of the inorganic thin layer of the laminate thus formed.

This protective resin layer is formed to provide the inorganic thin layer with barrier stability, adhesiveness, water resistance, water-resistant adhesiveness, scratch resistance, and so forth.

This protective resin layer may be formed by applying on the inorganic thin layer a coating solution containing at least one resin selected from the group consisting of, for example, a polyester resin, a polyurethane resin, a polyacryl resin, an isocyanate resin, an oxazoline resin, a carbodiimide resin, an alcoholic hydroxide-containing resin, and an ionomer resin, and then by drying it.

For coating of this coating solution, an appropriate method is selected from heretofore known coating methods. For example, any coating method including those using a reverse roll coater, a gravure coater, a rod coater, an air doctor coater, or a spray may be used.

In order to effectively express the foregoing functions as well as to suppress blocking and so on, thickness of the protective resin layer is usually in the range of about 0.05 to about 10 μm, or preferably in the range of 0.1 to 1 μm.

In the gas-barrier laminate of the present invention, in view of the gas barrier properties, in the case that the protective resin layer is further formed on the inorganic thin layer after the inorganic thin layer is formed, it is preferable to carry out the heat treatment after formation of this protective resin layer. Temperature of the heat treatment is preferably in the range of 60° C. or higher to below the substrate's melting point, more preferably in the range of 70° C. or higher to below the substrate's melting point, or still more preferably in the range of 70 to 160° C.

In the gas-barrier laminate of the present invention, it is preferable to laminate a heat-sealable resin layer on the outer surface of the gas-barrier laminate directly or via a resin layer such as an adhesive resin layer. The heat-sealable resin layer may be formed by a co-extrusion laminating method by using a resin which has an excellent heat-sealing property, such as for example, low-density polyethylene, polypropylene, ethylene-vinyl acetate copolymer, an ionomer resin, an acryl resin, and a biodegradable resin; alternatively, these respective resin films may be laminated by a dry lamination method using an urethane adhesive, an acryl resin, a polyester resin, or the like.

Thickness of the heat-sealable resin layer is not particularly restricted, while it is usually in the range of about 5 to about 400 μm, or preferably in the range of 20 to 100 μm.

Total thickness of the gas-barrier laminate of the present invention may be selected appropriately in accordance with its use; however, in view of the gas barrier properties, strength, flexibility, transparency, economy, and so on, the thickness is usually in the range of about 10 to about 1000 μm, or preferably in the range of 30 to 500 μm. There are no particular restrictions in the width and the length thereof; and thus, these can be selected appropriately in accordance with its use.

4-1. Water Vapor Barrier Property and Oxygen Barrier Property

The water vapor barrier property of the gas-barrier laminate of the present invention is preferably 0.2 g/m$^2$·24-hour or less, or more preferably 0.1 g/m$^2$·24-hour or less, in terms of the water vapor permeation rate, in view of avoiding deterioration of a substance stored therein. The water vapor permeation rate can be measured by the method described in EXAMPLES as shown later in accordance with the conditions shown in JIS Z0222 "Water Vapor Permeability Test Method of Waterproof Packaging Container" and JIS Z0208 "Water Vapor Permeability Test Method of Waterproof Packaging Container (Cup Method)".

Moreover, in the gas-barrier laminate of the present invention, the oxygen permeation rate measured under the conditions of the relative humidity of 80% with the temperature of 25° C. is preferably 0.4 cc/m$^2$·24-hour·atm or less, more preferably 0.3 cc/m$^2$·24-hour·atm or less, or still more preferably 0.2 cc/m$^2$·24-hour·atm or less, in view of avoiding oxidation of a substance stored therein. The oxygen permeation rate can be measured by the method described in EXAMPLES in accordance with JIS K7126 B-method as shown later.

4-2. Adhesion Strength Between Polyester Substrate and Inorganic Thin Layer

Adhesion strength (interlayer strength) between the substrate and the inorganic thin layer in the gas-barrier laminate of the present invention is preferably 200 g/15-mm or higher, or more preferably 300 g/15-mm or higher.

The interlayer strength can be measured in accordance with JIS Z1707 as described later by using a tensile testing instrument so as to a sample obtained by cutting the gas-barrier laminate film into a prescribed strip specimen.

The gas-barrier laminate of the present invention has excellent gas barrier properties and excellent adhesion between the substrate and the inorganic thin layer, so that this can be suitably used, for example, as a packaging material for a medical drug, a food stuff, and an industrial good to prevent change of qualities thereof from occurring; or as a transparent conductive sheet, a sealing sheet, and so forth used in a liquid crystal display element, a solar cell, an electromagnetic shield, a touch panel, an EL substrate, a color filter, or the like. Especially the gas-barrier laminate of the present invention has a property to cut an UV light so that this is highly effective to prevent deterioration of a substance stored therein from occurring; and thus, this is preferably used as a packaging material for a medical drug, particularly as a UV light-shielding material.

EXAMPLES

Hereinafter, the present invention will be explained specifically by using Examples; but the present invention is not limited to the following Examples. Meanwhile, evaluation methods of the films in the following Examples are as following.

1. Water Vapor Permeation Rate

The water vapor permeation rate was measured by the method described below in accordance with the conditions shown in JIS Z0222 "Water Vapor Permeability Test Method of Waterproof Packaging Container" and JIS Z0208 "Water Vapor Permeability Test Method of Waterproof Packaging Container (Cup Method)".

Two sheets of the gas-barrier laminate film having the permeation area of a 10.0 cm ×10.0 cm square were used to make a bag by sealing the four sides thereof in which about 20 g of anhydrous calcium chloride was stored as a moisture absorbent; and then, this bag was kept in a chamber whose temperature and humidity were kept constant at 40° C. and the relative humidity of 90%. The weight of the bag (0.1 mg unit) was measured until 14 days, which is the indication time when the weight increase thereof becomes almost constant in the interval of 48 hours or more; and then the water vapor permeation rate was calculated by the following equation.

Water vapor permeation rate $(g/m^2 \cdot 24\text{-hour})=(m/s)/t$ m: increased mass (g) between the last two measurements in the test period s: permeation area (m²)

t: time (hour) of the interval between the last two measurements/24 (hour)

2. Oxygen Permeation Rate

The oxygen permeation rate (cc/m²·24-hour·atm) of each of the gas-barrier laminate films was measured under the conditions of the temperature of 25° C. and the relative humidity of 80% by using the oxygen permeation rate measurement instrument OX-TRAN Model 2/21 (manufactured by MOCON, Inc.) in accordance with JIS K7126 B-method.

3. Laminate (Interlayer) Strength (g/15-mm)

In accordance with JIS Z1707, the gas-barrier laminate film was cut into a strip specimen having the width of 15 mm; and then, the laminate strength (g/15-mm) of the specimen whose end tip was partially delaminated was measured by using the peel testing instrument EZ-TEST (manufactured by Shimadzu Corp.) with the T-peeling rate of 100 mm/minute.

Note that, the peeling during measurement of the laminate strength takes place nearby the interface between the substrate and the anchor coat layer or nearby the interface between the anchor coat layer and the inorganic thin layer.

4. Color Measurement

Measurement of the color of the vapor-deposited plastic film was done as to b* by using the spectrophotometer SD-6000 (NIPPON DENSHOKU INDUSTRIES Co., Ltd.) with D65 and the view angle of 2°.

As the b* value is larger, the film is more yellowish.

5. UV Beam Shielding Property

The light absorbance of the gas-barrier laminate film was measured in the wavelength range of 200 to 800 nm in accordance with JIS K 0115 by using the spectrophotometer U-4100 (manufactured by Hitachi High-Technologies Corp.) (in Table 1, absorption of the light at the wavelength of 350 nm is shown).

6. Used Material 6-1. Polyester Substrate

A-1: Biaxially stretched PEN film (thickness of 12 μm, manufactured by Teijin DuPont Films Japan Limited)

A-2: Co-extruded biaxially stretched three-layer film (PEN layer/mixed PET-PEN layer/ PET layer with the total thickness of 12 μm (1 μm PEN layer/10 μm mixed layer/1 μm PET layer), manufactured by Mitsubishi Polyester Film GmbH)

A-3: Biaxially stretched PET film (thickness of 12 μm, manufactured by Mitsubishi Plastics, Inc.)

6-2. Anchor Coat Material

B-1 (Examples 1 and 2, and Comparative Example 3)

A solution containing 8% by mass of an acryl polyol was mixed with an isocyanate compound with the mass ratio of 1:1, and then, a solvent mainly comprising methyl ethyl ketone was added thereinto to obtain an anchor coat material having 0.08 as the mass ratio of the acryl polyol (solid portion)/the isocyanate compound (solid portion).

B-2 (Comparative Examples 1, 2, and 4)

A solution containing 12% by mass of a polyester polyol was mixed with a solution containing 75% by mass of an isocyanate compound with the mass ratio of 1:1, and then, a solvent mainly comprising methyl ethyl ketone was added thereinto to obtain an anchor coat material having 0.16 as the mass ratio of the polyester polyol (solid portion)/the isocyanate compound (solid portion).

B-3 (Example 3)

A solution containing 8% by mass of an acryl polyol was mixed with an isocyanate compound with the mass ratio of 2:1, and then, a solvent mainly comprising methyl ethyl ketone was added thereinto to obtain an anchor coat material having 0.16 as the mass ratio of the acryl polyol (solid portion)/the isocyanate compound (solid portion).

Example 1

The anchor coat material (B-1) was applied by a gravure coating method onto one surface of the biaxially stretched PEN film having the thickness of 12 μm (A-1) to obtain an anchor coat layer having the thickness of about 0.02 μm.

Then, silicon oxide (SiOx) was vapor deposited by using SiO onto this anchor coat layer under vacuum of 0.0013 Pa ($1 \times 10^{-5}$ Torr) by using a vacuum vapor deposition apparatus to obtain a vapor-deposited plastic film with the thickness of the vapor-deposited layer SiOx being about 30 nm. Further on the deposited side thereof was dry-laminated with an unstretched polypropylene film having the thickness of 60 μm by using an adhesive to obtain a gas-barrier laminate film having the thickness of about 72 μm. The vapor-deposited plastic film and the gas-barrier laminate film thus obtained were evaluated by the above-mentioned methods; and the results thereof are shown in Table 1.

Example 2

The gas-barrier laminate film having the thickness of about 72 μm was obtained in the manner similar to that of Example 1 except that the co-extruded biaxially stretched three-layer film having the thickness of 12 μm (A-2) was used as the substrate, the anchor coat material (B-1) was applied by a gravure coating method onto the PEN side of the substrate to obtain an anchor coat layer, and then silicon oxide (SiOx) was vapor-deposited onto this anchor coat layer. The vapor-deposited plastic film and the gas-barrier laminate film thus obtained were evaluated by the above-mentioned methods; and the results thereof are shown in Table 1.

Example 3

The gas-barrier laminate film having the thickness of about 72 pm was obtained in the manner similar to that of Example 1 except that the co-extruded biaxially stretched three-layer film having the thickness of 12 μm (A-2) was used as the substrate, the anchor coat material (B-3) was applied by a gravure coating method onto the PEN side of the substrate to obtain an anchor coat layer, and then silicon oxide (SiOx) was vapor-deposited onto this anchor coat layer. The vapor-deposited plastic film and the gas-barrier laminate film thus obtained were evaluated by the above-mentioned methods; and the results thereof are shown in Table 1.

Comparative Example 1

The gas-barrier laminate film having the thickness of about 72 μm was obtained in the manner similar to that of Example 1 except that the anchor coat material (B-2) was applied by a gravure coating method onto one side of the biaxially stretched PEN film having the thickness of 12 μm (A-1) to obtain an anchor coat layer, and then silicon oxide (SiOx) was vapor-deposited onto this anchor coat layer. The vapor-deposited plastic film and the gas-barrier laminate film thus obtained were evaluated by the above-mentioned methods; and the results thereof are shown in Table 1.

Comparative Example 2

The gas-barrier laminate film having the thickness of about 72 μm was obtained in the manner similar to that of Example 1 except that the co-extruded biaxially stretched three-layer film having the thickness of 12 μm (A-2) was used as the substrate, the anchor coat material (B-2) was applied by a gravure coating method onto the PEN side of the substrate to obtain an anchor coat layer, and then silicon oxide (SiOx) was vapor-deposited onto this anchor coat layer. The vapor-deposited plastic film and the gas-barrier laminate film thus obtained were evaluated by the above-mentioned methods; and the results thereof are shown in Table 1.

Comparative Example 3

The gas-barrier laminate film having the thickness of about 72 μm was obtained in the manner similar to that of Example 1 except that the biaxially stretched PET film having the thickness of 12 μm (A-3) was used as the substrate. The vapor-deposited plastic film and the gas-barrier laminate film thus obtained were evaluated by the above-mentioned methods; and the results thereof are shown in Table 1.

Comparative Example 4

The gas-barrier laminate film having the thickness of about 72 μm was obtained in the manner similar to that of Comparative Example 1 except that the biaxially stretched PET film having the thickness of 12 μm (A-3) was used as the substrate. The vapor-deposited plastic film and the gas-barrier laminate film thus obtained were evaluated by the above-mentioned methods; and the results thereof are shown in Table 1.

TABLE 1

| | Substrate | Anchor coat material | Water vapor permeating rate g/($m^2$ · 24-hour) | Oxygen permeating rate cc/($m^2$ · 24-hour · atm) | Laminate strength g/15-mm | b* | Absorbance at light wavelength of 350 nm |
|---|---|---|---|---|---|---|---|
| Example 1 | A-1 | B-1 | 0.05 | 0.16 | 340 | 5 | 100 |
| Example 2 | A-2 | B-1 | 0.06 | 0.15 | 860 | 2 | 99 |
| Example 3 | A-2 | B-3 | 0.14 | 0.35 | 870 | 2 | 99 |
| Comparative Example 1 | A-1 | B-2 | 0.66 | 0.50 | 180 | 5 | 100 |
| Comparative Example 2 | A-2 | B-2 | 0.33 | 0.30 | 570 | 2 | 99 |
| Comparative Example 3 | A-3 | B-1 | 0.30 | 0.28 | 640 | 2 | 31 |
| Comparative Example 4 | A-3 | B-2 | 0.30 | 0.30 | 680 | 2 | 31 |

From Table 1, it can be seen that Examples 1 to 3, in which the substrate has the PEN layer, and in addition, the acryl polyol is used as the anchor coat component, show excellent water vapor barrier properties as compared with Comparative Examples 1 and 2 in which the polyester polyol is used. Especially Examples 1 and 2 show not only extremely excellent water vapor barrier properties but also excellent oxygen barrier properties.

In addition, it can be seen that Example 1 shows higher laminate strength as compared with Comparative Example 1. Similarly, it can be seen that Example 2 shows higher laminate strength as compared with Comparative Example 2.

On the contrary, from Table 1, Comparative Examples 3 and 4, in which the substrate comprising only PET is used, show the laminate strength, but do not show improvement in the water vapor permeation rate nor in the oxygen permeation rate even if the acryl polyol is used as the anchor coat component.

From the above results, it became clear that, in the case that the substrate has the PEN layer, if the acryl polyol is used as the anchor coat component, not only especially excellent water vapor barrier property and excellent oxygen barrier property but also enhanced laminate strength can be obtained.

Industrial Applicability

The gas-barrier laminate of the present invention shows excellent gas barrier properties and high adhesion strength between the substrate and the inorganic thin layer; and thus, this can be suitably used as a packaging material for preventing the change of qualities of a medical drug, a food stuff, an industrial good, and so forth; or as a transparent conductive sheet, a sealing sheet, and so forth used in a liquid crystal display element, a solar cell, an electromagnetic shield, a touch panel, an EL substrate, a color filter, or the like.

The invention claimed is:

1. A gas-barrier laminate, comprising:
   a substrate comprising a polyethylene naphthalate (PEN) layer, a mixed PET-PEN layer comprising a mixture of polyethylene naphthalate and polyethylene terephthalate on the PEN layer, and a polyethylene terephthalate (PET) layer on the mixed PET-PEN layer;
   an anchor coat layer formed from a composition comprising an acryl polyol and an isocyanate compound on a surface of the PEN layer; and
   an inorganic thin layer, arranged in the stated order.

2. The gas-barrier laminate according to claim 1, wherein a mass ratio of the acryl polyol to the isocyanate compound, (acryl polyol)/(isocyanate compound), is from 0.01 to 0.5.

3. The gas-barrier laminate according to claim 1, wherein the gas-barrier laminate is suitable as a packaging material for a medical purpose.

4. The gas-barrier laminate according to claim 1, wherein a mass ratio of the acryl polyol to the isocyanate compound, (acryl polyol)/(isocyanate compound), is from 0.05 to 0.15.

5. The gas-barrier laminate according to claim 1, wherein the substrate is a biaxially stretched substrate.

6. The gas-barrier laminate according to claim 1, wherein the ratio of each of the PEN layer, the PET layer, and the mixed PET-PEN layer relative to the total thickness is from 5 to 90%.

7. The gas-barrier laminate according to claim 1, wherein a total thickness of the substrate is from 5 to 500 μm.

8. The gas-barrier laminate according to claim 1, wherein a total thickness of the substrate is from 10 to 50 μm.

9. The gas-barrier laminate according to claim 1, wherein a content of acryl polyol in the composition is from 1 to 20% by mass, relative to a total solid amount in the composition.

10. The gas-barrier laminate according to claim 1, wherein a content of acryl polyol in the composition is from 2 to 10% by mass, relative to a total solid amount in the composition.

11. The gas-barrier laminate according to claim 1, wherein a content of isocyanate compound in the composition is from 5 to 99% by mass, relative to a total solid amount in the composition.

12. The gas-barrier laminate according to claim 1, wherein a content of isocyanate compound in the composition is from 50 to 95% by mass, relative to a total solid amount in the composition.

13. The gas-barrier laminate according to claim 1, wherein a thickness of the anchor coat layer is from 0.001 to 1 µm.

14. The gas-barrier laminate according to claim 1, wherein a thickness of the anchor coat layer is from 0.01 to 0.1 µm.

15. The gas-barrier laminate according to claim 1, wherein a thickness of the inorganic thin layer is from 0.1 to about 500 nm.

16. The gas-barrier laminate according to claim 1, wherein a thickness of the inorganic thin layer is from 1 to 100 nm.

17. The gas-barrier laminate according to claim 1, wherein a total thickness of the gas-barrier laminate is in the range of 30 to 500 µm.

* * * * *